(12) United States Patent
Yoshida et al.

(10) Patent No.: US 7,754,109 B2
(45) Date of Patent: *Jul. 13, 2010

(54) VARISTOR ELEMENT

(75) Inventors: Naoyoshi Yoshida, Tokyo (JP); Hitoshi Tanaka, Tokyo (JP); Dai Matsuoka, Tokyo (JP)

(73) Assignee: TDK Corporation, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 12/036,435

(22) Filed: Feb. 25, 2008

(65) Prior Publication Data

US 2008/0210911 A1     Sep. 4, 2008

(30) Foreign Application Priority Data

Mar. 2, 2007    (JP) .............................. 2007-053286

(51) Int. Cl.
*H01B 1/08*     (2006.01)
*H01C 7/112*    (2006.01)

(52) U.S. Cl. .......................... 252/519.51; 252/519.15; 338/20; 338/21

(58) Field of Classification Search ............ 252/519.51, 252/519.15; 338/20, 21
See application file for complete search history.

(56) References Cited

U.S. PATENT DOCUMENTS

| | | | | |
|---|---|---|---|---|
| 5,008,646 A | * | 4/1991 | Hennings et al. | 338/20 |
| 5,140,296 A | * | 8/1992 | Sakaguchi et al. | 338/21 |
| 5,153,554 A | * | 10/1992 | Becker et al. | 338/21 |
| 5,640,136 A | * | 6/1997 | Yodogawa et al. | 338/20 |
| 5,707,583 A | * | 1/1998 | Yodogawa | 264/617 |
| 5,870,273 A | * | 2/1999 | Sogabe et al. | 361/306.3 |
| 5,994,995 A | * | 11/1999 | Ogasawara et al. | 338/21 |
| 6,620,346 B1 | * | 9/2003 | Schulz et al. | 252/519.51 |
| 7,075,404 B2 | * | 7/2006 | Hirose et al. | 338/21 |
| 7,507,356 B2 | * | 3/2009 | Yoshida et al. | 252/519.51 |
| 2008/0210911 A1 | * | 9/2008 | Yoshida et al. | 252/513 |
| 2008/0241585 A1 | * | 10/2008 | Yoshida et al. | 428/688 |

FOREIGN PATENT DOCUMENTS

| | | | |
|---|---|---|---|
| JP | A-2002-246207 | | 8/2002 |
| JP | A-2005-079327 | | 3/2005 |
| JP | 2008218665 A | * | 9/2008 |
| KR | 1992-0002084 | | 8/1988 |

OTHER PUBLICATIONS

Korean Patent Office, English translation of Notice of Preliminary Rejection for Korean Patent Application No. 10-2008-0018136, mailed Feb. 1, 2010, pp. 1-6.

* cited by examiner

*Primary Examiner*—Douglas Mc Ginty
(74) *Attorney, Agent, or Firm*—Oliff & Berridge, PLC

(57) ABSTRACT

In a varistor element, Ca exists in the grain interior of grains consisting primarily of ZnO in a varistor element body and Ca also exists in a grain boundary. In this crystal structure Ca replaces oxygen defects in the grain interior of grains consisting primarily of ZnO, in the varistor element body to make the ceramic structure denser Such crystal structure also decreases a ratio of an element tending to degrade the stability of the temperature characteristic of the varistor element, e.g., Si as a firing aid, in the grain boundary between grains. As a result, the varistor element has a stable temperature characteristic, which can decrease change in capacitance and tan δ (thermal conversion factor of resistance) against change in temperature.

2 Claims, 9 Drawing Sheets

Fig. 9

| NO. | Ca analytic amount | | interior/boundary ratio | ΔC at 85°C [%] | tan δ at 85°C [%] |
|---|---|---|---|---|---|
| | grain interior [atm%] | grain boundary [atm%] | | | |
| 1 | 0.5 | 1.7 | 0.29 | 6.8 | 5.0 |
| 2 | 0.5 | 2.8 | 0.18 | 8.2 | 8.4 |
| 3 | 0.2 | 0.50 | 0.40 | 9.5 | 9.5 |
| 4 | 0.7 | 7.0 | 0.10 | 8.2 | 8.2 |
| 5 | 2.0 | 6.7 | 0.3 | 9.8 | 9.0 |
| 6 | 0.15 | 1.85 | 0.08 | 18.0 | 35.0 |
| 7 | 0.05 | 1.0 | 0.05 | 14.0 | 31.0 |
| 8 | 2.3 | 25.6 | 0.09 | 17.5 | 120.0 |

VARISTOR ELEMENT

BACKGROUND OF THE INVENTION

1. Field of the Invention

The present invention relates to a varistor element.

2. Related Background Art

A varistor element has a fired product obtained by firing a varistor material, for example, containing ZnO as a principal ingredient and containing a rare-earth element, an oxide of a IIIb-group element, and an oxide of a Ia-group element as accessory ingredients. An example of this varistor element is the one described in Japanese Patent Application Laid-open No. 2002-246207. This varistor element has a longer operating life achieved by defining a ratio of the elements contained in the fired product.

SUMMARY OF THE INVENTION

The above-described varistor element is incorporated in an electronic device, e.g., a notebook computer or a cell phone to function as a bypass for protecting an integrated circuit from a high voltage such as static electricity. However, the electronic device accumulates heat with time of use and therefore the varistor element incorporated therein is required to have a stable temperature characteristic.

The present invention has been accomplished in order to solve the above problem and an object of the invention is to provide a varistor element with a stable temperature characteristic.

In order to solve the above problem, the inventors conducted elaborate research and came to focus on a crystal structure of the fired product rather than the composition of the fired product obtained by firing of the varistor material. As a result we found that a lot of oxygen defects normally existed in grains constituting the fired product and containing ZnO as a principal ingredient and that a certain element entered the oxygen defects to affect the temperature characteristic of the varistor element. Therefore, the inventors came to have a finding that the stability of the temperature characteristic of the varistor element must be improved by structurally specifying the element entering the crystal structure of the fired product, thereby accomplishing the present invention.

A varistor element according Lo the present invention comprises a fired product obtained by firing a varistor material containing ZnO as a principal ingredient and containing a rare-earth element, Co, and Ca, wherein Ca exists in each of a grain interior and a grain boundary of the fired product.

In this varistor element, Ca exists in each of the grain interior and the grain boundary containing ZnO as the principal ingredient in the fired product. For this reason, Ca replaces the oxygen defects in the grain interior of grains containing ZnO as the principal ingredient, to make the ceramic structure denser. It also reduces a ratio of an element (e.g., Si) which tends to degrade the stability of the temperature characteristic of the varistor element, in the grain boundary between the grains containing ZnO as the principal ingredient In this configuration, the varistor element comes to have a stable temperature characteristic. One grain boundary stated herein refers to a boundary region between two adjacent grains among the grains containing ZnO as the principal ingredient.

An amount of Ca existing in the grain interior in the fired product is preferably 0.2 atm %-2.0 atm %. In this case, the temperature characteristic of the varistor element is effectively stabilized.

A ratio of an amount of Ca existing in the grain interior in the fired product to an amount of Ca existing in the grain boundary in the fired product is preferably 0.1-0.4. In this range the ratio of the element tending to degrade the stability of the temperature characteristic of the varistor element is sufficiently lowered in the grain boundary of ZnO to stabilize the temperature characteristic of the varistor element more remarkably. Furthermore, the resistance in the grain boundary increases to reduce a leak current.

Preferably, the rare-earth element is Pr and Pr exists in the grain boundary in the fired product. This configuration can further enhances the effects of the stabilization of the temperature characteristic of the varistor element aid the reduction of the leak current.

The varistor element according to the present invention has a stable temperature characteristic.

BRIEF DESCRIPTION OF THE DRAWINGS

FIG. 9 is a drawing showing the experiment results of another evaluation experiment.

DESCRIPTION OF THE PREFERRED EMBODIMENTS

The preferred embodiments of the varistor element according to the present invention will be described below in detail with reference to the drawings.

Figure 1:
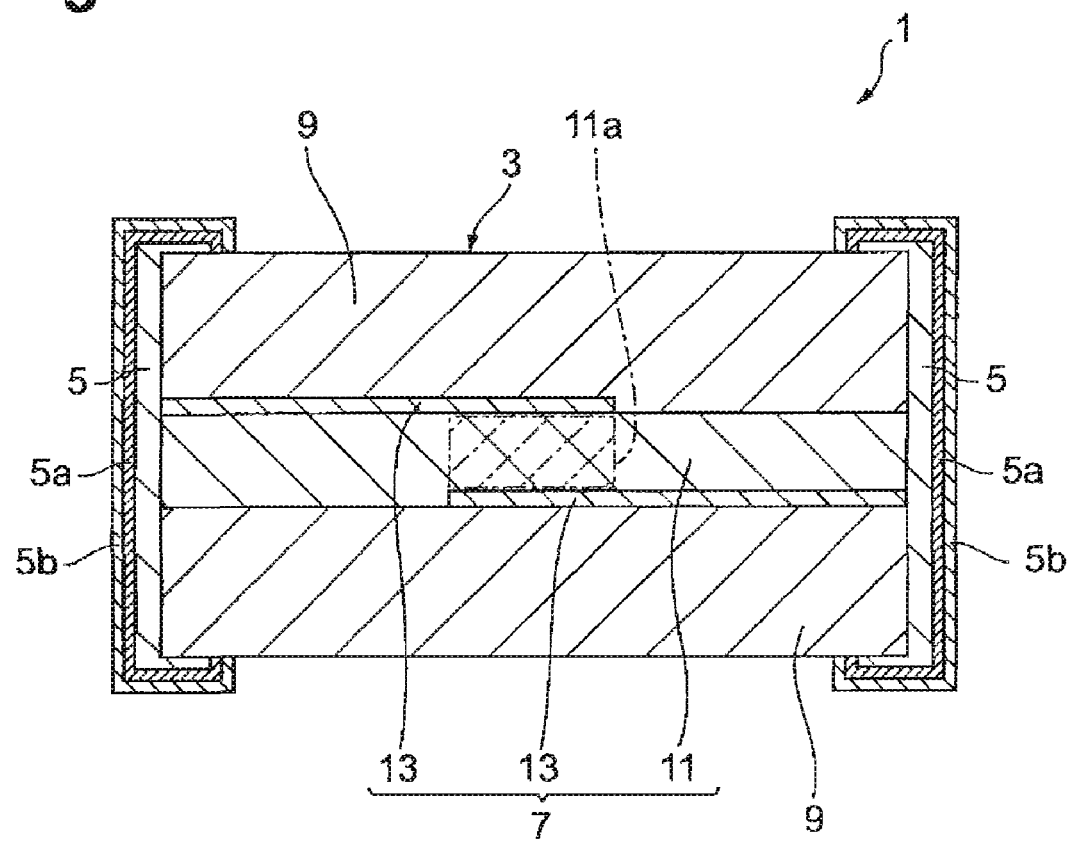
FIG. 1 is a drawing showing a sectional configuration of a varistor element according to an embodiment of the present invention.

FIG. 1 is a drawing showing a sectional configuration of a varistor element according to an embodiment of the present invention As shown in FIG. 1, the varistor element 1 has a varistor element body (fired product) 3 of a nearly rectangular parallelepiped shape, and a pair of external electrodes 5, 5 formed on the respective ends in the longitudinal direction of the varistor element body 3. This varistor element 1 is, for example, a so-called 1608 type multilayer chip varistor set in the length of 1.6 mm, the width of 0.8 mm, and the height of 0.8 mm.

The varistor element body 3 is constructed as a laminate consisting of a varistor section 7, and outer layer sections 9, 9 located on both sides of the varistor section 7. More specifically, the varistor section 7 has a varistor layer 11 to exhibit the varistor characteristic. and a pair of internal electrodes 13, 13 arranged nearly in parallel on both sides of the varistor layer 11. The varistor layer 11 contains ZnO as a principal ingredient and contains Pr (rare-earth element), Co, Ca, oxides of these, etc. as accessory ingredients. The varistor layer 11 also contains Al, K, Cr, and Si as other accessory ingredients.

The ratio of the elements existing in the varistor layer 11 is Zn 95.795 atm %, Pr 0.5 atm %, Co 1.5 atm %, Al 0.005 atm %, K 0.05 atm%, Cr 0.1 atm %, Ca 2.0 atm %, and Si 0.05 atm %. The thickness of the varistor layer 11 is, for example, approximately 5 µm-60 µm. In a practical varistor element 1, the outer layer sections 9 and the varistor layer 11 are integrally formed so that no boundary can be visually recognized.

The internal electrodes 13, 13 are of a nearly rectangular shape and are set, for example, in the thickness of 0.5 µm-5 µM. One end of one internal electrode 13 extends up to one longitudinal end face of the varistor element body 3 and the other end thereof is located at a predetermined distance inside the other longitudinal end face of the varistor element body 3, One end of the other internal electrode 13 is located at a predetermined distance inside the one longitudinal end face of the varistor element body 3 and the other end thereof extends up to the other longitudinal end face of the varistor element body 3.

Namely, the internal electrodes 13, 13 are alternately arranged when seen from the side face side of the varistor element body 3 and the other end side of the one internal electrode 13 and the one end side of the other internal electrode 13 are opposed to each other with the varistor layer 11 in between. In his configuration, a region 11a between the internal electrodes 13, 13 functions as a region to exhibit The varistor characteristic, in the varistor layer 11. The internal electrodes 13, 13 contain Pd as an electroconductive material, but it may be an alloy of Pd and Ag, or the like.

The outer layer sections 9, 9 contain ZnO as a principal ingredient and contain Pr (rare-earth element), Co, Ca, oxides of these, etc. as accessory ingredients, as the varistor layer 11 does. The outer layer sections 9, 9 also contain Al, K, Cr, and Si as other accessory ingredients. The ratio of the elements existing in the outer layer section 9 is the same as that in the varistor layer 11. The thickness of the outer layer section 9 is, for example, approximately 0.1 mm-0.4 mm.

The external electrodes 5, 5 are formed, for example, by baking an electroconductive paste containing Ag as a principal ingredient, and are provided so as to cover the two longitudinal ends of the varistor element body 3, respectively. In this configuration, the external electrodes 5, 5 are electrically connected to The respective internal electrodes 13, 13 exposed in the one longitudinal end face and the other longitudinal end face of the varistor element body 3.

A Ni-plated layer 5a and a Sn-plated layer 5b are formed on each of the surfaces of the external electrodes 5, 5. This ensures solderability of the varistor element 1 in a work of mounting the varistor element 1 on a substrate of an electronic device such as a notebook computer or a cell phone by reflow soldering.

Figure 2:
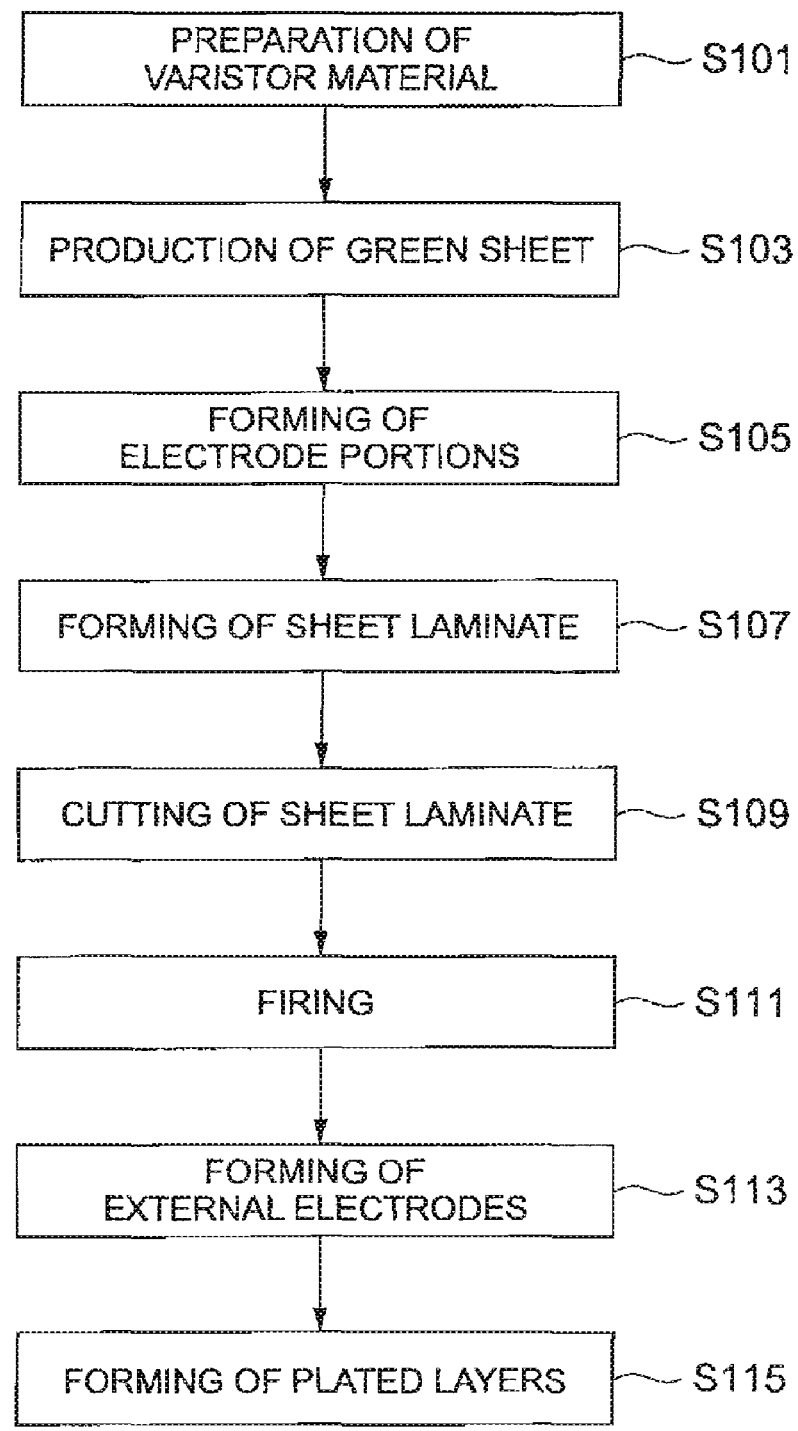
FIG. 2 is a flowchart showing a production procedure of the varistor element shown in FIG. 1.
Figure 3:
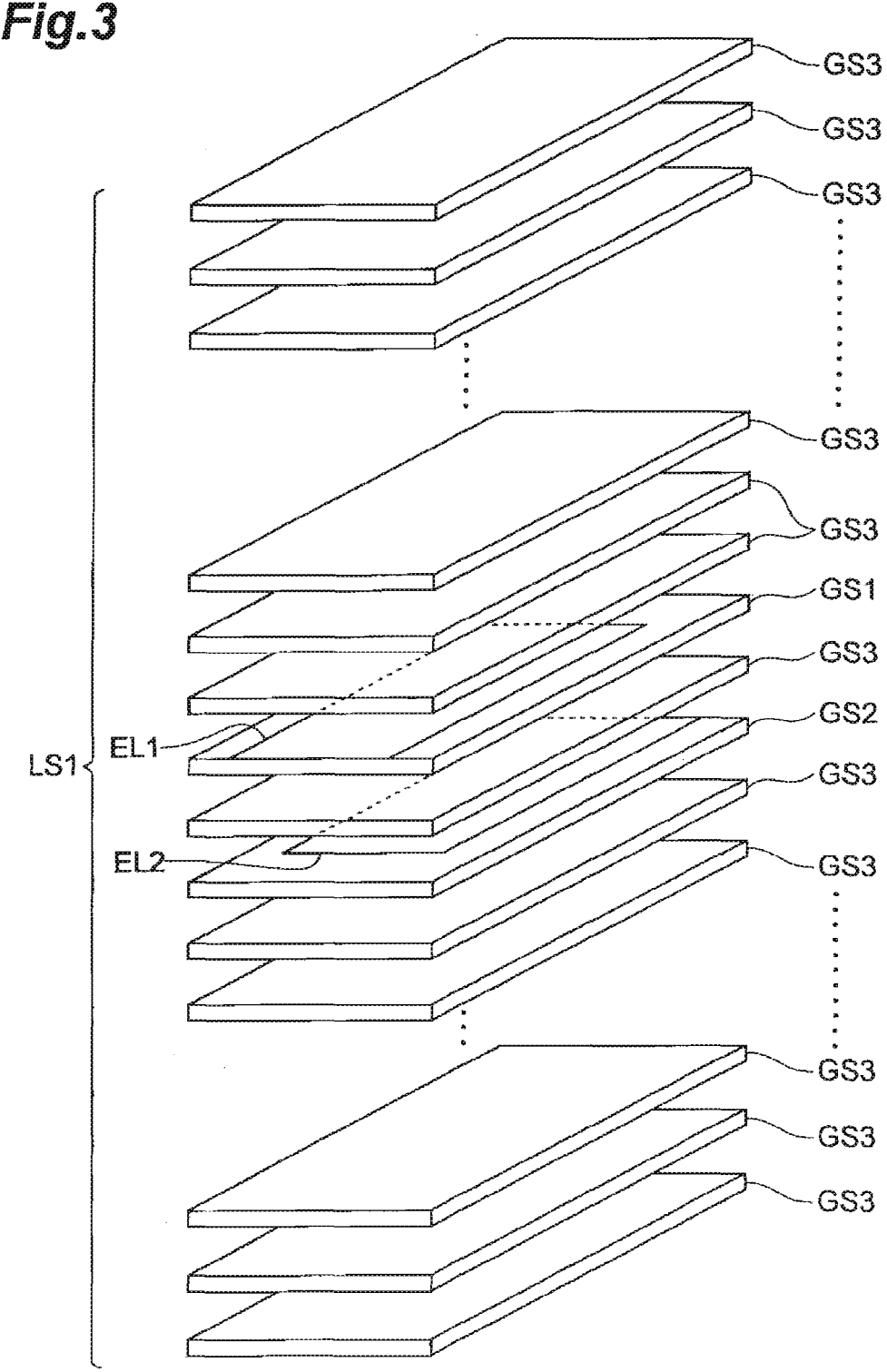
FIG. 3 is a drawing showing a state of the varistor element being produced.

Subsequently, a production method of the varistor element 1 having the above-described configuration will be described below with reference to FIGS. 2 and 3. FIG. 2 is a flowchart showing a production procedure of the varistor element. FIG. 3 is a drawing showing a state of the varistor element being produced.

First, ZnO as the principal ingredient of the varistor layer 11 and the outer layer sections 9 is mixed with the accessory ingredients of Pr, Co, and Ca and the other accessory ingredients of Al, K, Cr; and Si to prepare a varistor material (step S101). More specifically, varistor raw materials are weighed so that the ratio of the elements existing in the varistor material becomes Zn 95.795 atm %, Pr 0.5 atm %, Co 1.5 atm %, Al 0.005 atm %, K 0.05 atm %, Cr 0.1 atm %, Ca 2.0 atm %, and Si 0.05 atm %.

After the preparation, an organic binder, an organic solvent, an organic phasticizer, etc. are added into the varistor material and they are mixed and pulverized for about 20 hours with a ball mill or the like to obtain a slurry. Next, the slurry is applied onto a film (not shown), for example, of polyethylene terephthalate, for example, by the doctor blade method and it is dried to form a membrane about 30 µm thick. The membrane obtained in this manner is peeled off the film to obtain a green sheet (step S103).

Next, electrode portions corresponding to The internal electrodes 13, 13 are formed on respective green sheets among those obtained as described above (step S105). The electrode portions corresponding to the internal electrodes 13, 13 are formed by printing an electroconductive paste obtained by mixing a metal powder consisting primarily of Pd, an organic binder, an organic solvent, etc., onto the green sheets, for example, by screen printing, and drying it.

Then the green sheets with the electrode portions, and green sheets without the electrode portions are stacked in a predetermined order to obtain a sheet laminate (step S107). The sheet laminate is then cut in chip unit to obtain a plurality of divided green bodies LS1 (step S109).

In the green body LS1 obtained, as shown in FIG. 3, the following green sheets are stacked in order: the green sheet GS1 with the electrode portion EL1 corresponding to one internal electrode 13; the green sheet GS2 with the electrode portion EL2 corresponding to the other internal electrode 13; and the green sheets GS3 without the electrode portions EL1, EL2. As for the green sheets GS3, a plurality of layers may be stacked as occasion may demand.

After the green body LS1 is obtained, the green body LS1 is heated, for example, at the temperature of 180° C.-400° C. for approximately 0.5 hour-24 hours to effect debindering. Furthermore, the green body LS1 is fired, for example, at the temperature of 1100° C. in the atmosphere for about 0.5 hour-8 hours (step S111). This firing results in turning the green sheets GS1-GS3 into the varistor layer 11 and the outer layer sections 9 and turning the electrode portions EL1, EL2 into the respective internal electrodes 13, 13, to obtain the varistor element body 3.

Figure 4:
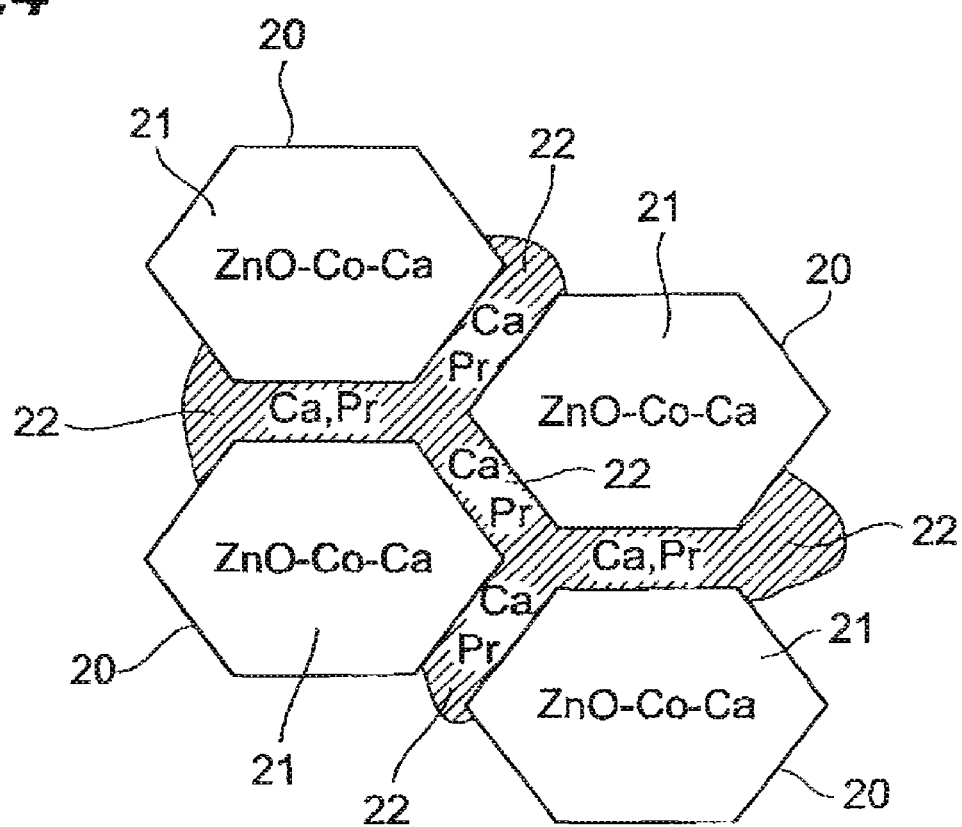
FIG. 4 is a drawing showing a crystal structure of the varistor element.

Under the firing conditions, as shown in FIG. 4. the resultant varistor element body 3 turns into a state in which Ca replaces the oxygen defects in the grains 20 consisting primarily of ZnO and Ca exists in each of the grain interior 21 of grains 20 and a grain boundary 22 between two adjacent grains 20, 20. Furthermore, the varistor element body 3 is in a state in which Pr exists in the grain boundary 22. This makes the ceramic structure of the varistor element body 3 denser.

It is considered that a certain amount of Ca is discharged from the grain interior 21 to the grain boundary 22 during the firing. For this reason, the amount of Ca existing in the grain interior 21 is about 0.5 atm %, whereas the amount of Ca existing in the grain boundary 22 is about 2.7 atm % near the center of the gain boundary 22. Namely, the ratio of the amount of Ca existing in the grain interior 21 to the amount of Ca existing in the grain boundary 22 is about 0.19.

After completion of the varistor element body 3, the external electrodes 5, 5 are then formed on the two respective ends in the longitudinal direction of the varistor element body 3 (step S113). For forming the external electrodes 5, 5, an electroconductive paste is first prepared by mixing a glass frit, an organic binder, and an organic solvent in a metal powder containing Ag. Then the prepared electroconductive paste is applied onto the two ends in the longitudinal direction of the varistor element body 3, for example, by dipping and It is dried to form electrode portions corresponding to the external electrodes 5, 5.

Then the electrodes thus formed are baked, for example, at 900° C. to turn the electrode portions into the respective external electrodes 5, 5. Finally, the Ni-plated layer 5a and Sn-plated layer 5b are formed so as to cover the external electrodes 5, 5 by a barrel plating method using a Ni-plating bath and a Sn-plating bath (step S115), thereby completing the varistor element 1 shown in FIG. 1.

In this varistor element 1, as described above, Ca exists in the amount of about 0.5 atm % in the grain interior 21 of the grains 20 containing ZnO as the principal ingredient and Ca exists in the amount of about 2.7 atm % in the grain boundary 22 in the varistor element body 3. As the varistor element body 3 has this crystal structure, Ca replaces the oxygen defects in the grain interior 21 of the grains 20 consisting primarily of ZnO, to make the ceramic structure denser. Such crystal structure also decreases the ratio of the element tending to degrade the stability of the temperature characteristic of the varistor element 1, e.g., Si as a fring aid, in the grain boundary 22 between grams 20 consisting primarily of ZnO. As a result this varistor element 1 has a stable temperature characteristic, which can decrease change in capacitance and tanδ (thermal conversion factor of resistance) against change in temperature.

In the varistor element 1, the ratio of the amount of Ca existing in the grain interior 21 to the amount of Ca existing in the grain boundary 22 is within the range of 0.1-0.4 and the amount of Ca is maximum near the center of the grain boundary 22. Furthermore, the varistor element body 3 is in a state in which Pr exists in the grain boundary 22. This structure sufficiently lowers the ratio of the element tending to degrade the stability of the temperature characteristic of the varistor element 1, whereby the temperature characteristic is stabilized more remarkably. Since the resistance increases in the grain boundary, the leak current is also reduced.

The following will describe an evaluation experiment about the effect of stabilizing the temperature characteristic in the varistor element according to the present invention.

This evaluation experiment was conducted as follows: samples of an example and a comparative example were produced as 1608 type varistor elements similar to that in the above-described embodiment and were evaluated by measuring a change rate of capacitance and a change rate of tanδ of each varistor element against change of ambient temperature from −60° C. to 150° C.

Figure 5:
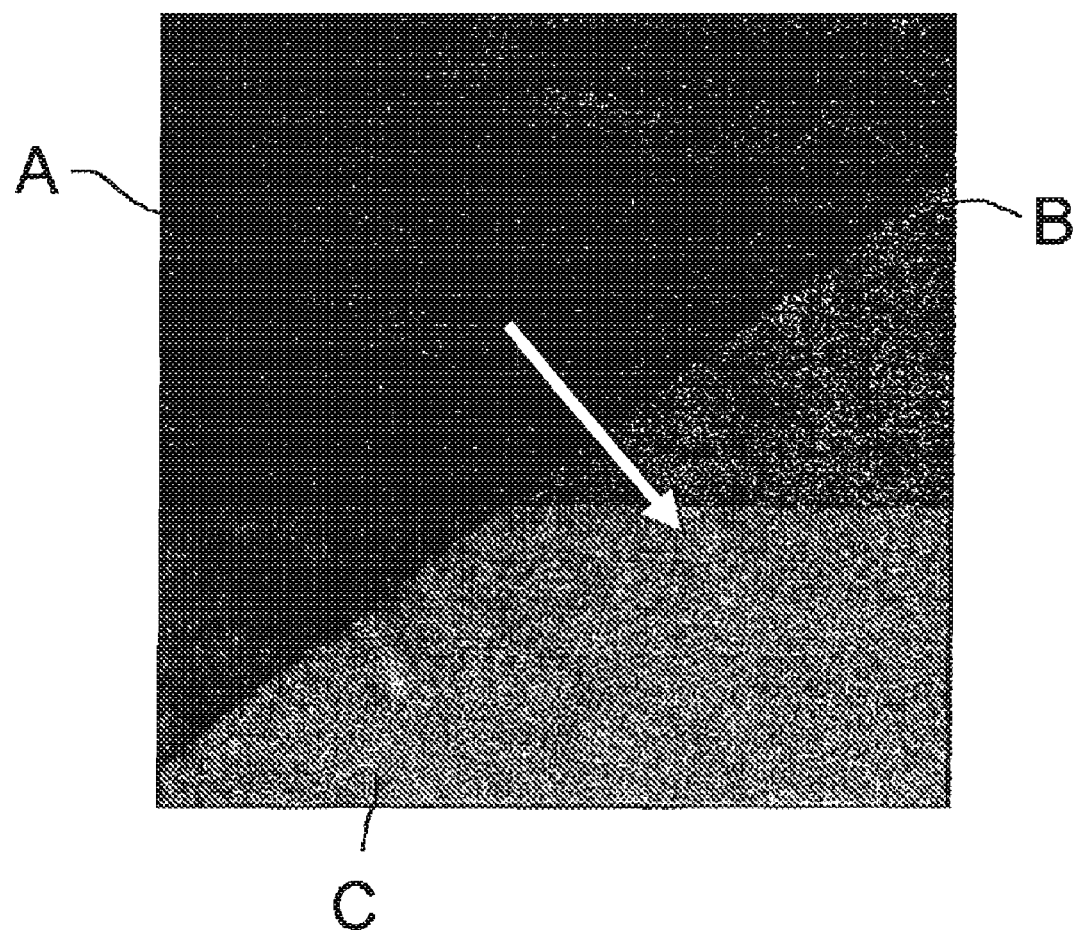
FIG. 5 is a drawing showing a detection procedure of the crystal structure of the varistor element by STEM.

The crystal structure of the varistor element body in each sample was detected with STEM "HD-2000" available from Hitachi-High-Technologies Corporation. The detection conditions were the probe diameter of 5 Å, the acceleration voltage of 200.0 kV, the magnification of ×1000, and the delay time of 0.6 s. As shown in FIG. 5, the probe was moved to scan an area from region A as the interior of one grain, across region B corresponding to a grain boundary, to region C as the interior of the other grain, thereby detecting the amount of elements existing in each of regions A-C.

Figure 6:
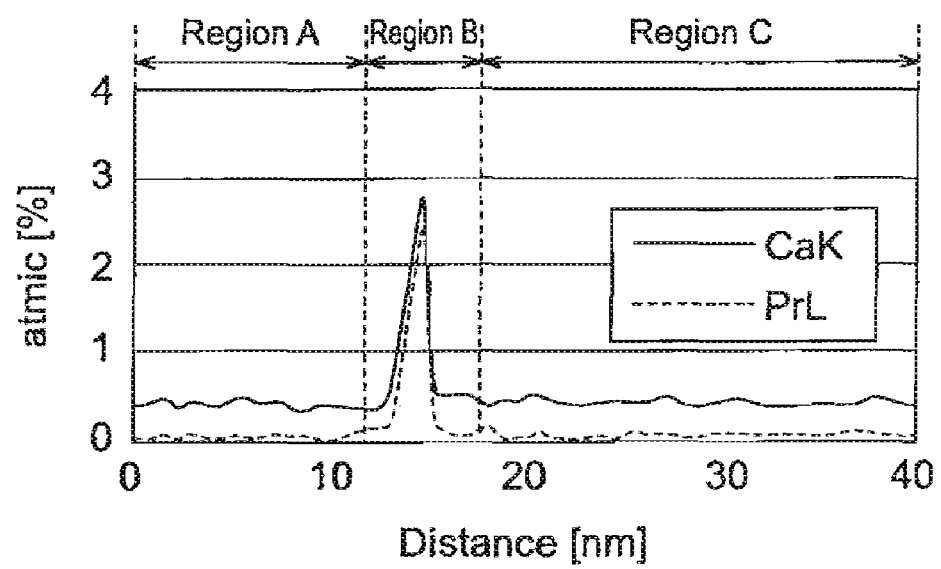
FIG. 6 is a drawing showing the detection result of STEM in a varistor element according to an example.

In the varistor element of the example, as shown in FIG. 6, the amounts of Ca in region A and region C were about 0.5 atm %, and the amount of Ca near the center of region B was about 2.8 atm %. The amounts of Pr in region A and region C were approximately 0 atm % and the amount of Pr near the center of region B was about 1.9 atm %.

Figure 7:
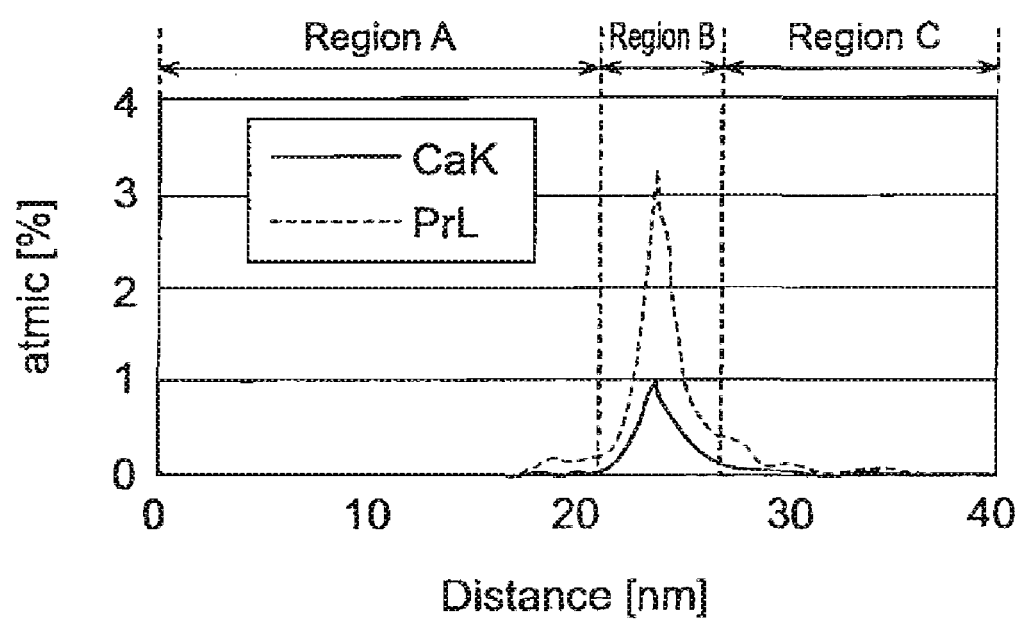
FIG. 7 is a drawing showing the detection result of STEM in a varistor element according to a comparative example.

On the other hand, in the varistor element of the comparative example, as shown in FIG. 7, the amounts of Ca in region A and region C were about 0.05 atm % and the amount of Ca near the center of the region B was about 1.0 atm %. The amounts of Pr in region A and region C were approximately 0 atm % and the amount of Pr near the center of region B was about 3.4 atm %.

Figure 8:
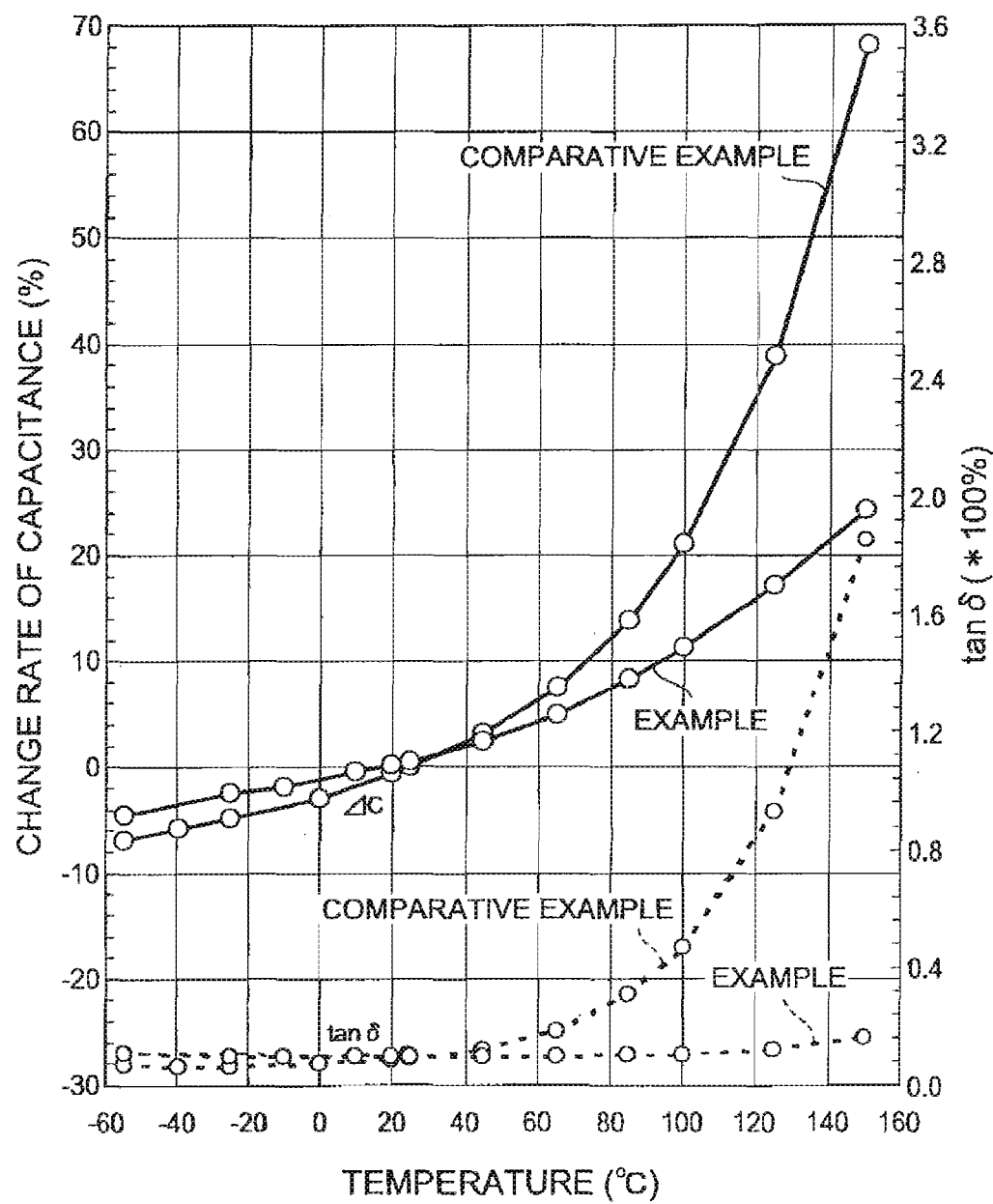
FIG. 8 is a drawing showing the evaluation results of temperature characteristics of varistor elements according to the example and comparative example.

FIG. 8 is a drawing showing the experiment results of the evaluation experiment. As shown in the same drawing, where the capacitance at 20° C. is defined as a reference (±0%), a change rate in capacitance at 85° C. is within about 8% in the varistor element of the example, whereas it is about 14% in the varistor element of the comparative example. The change rate in capacitance at 150° C. is within about 22% in the varistor element of the example, whereas it is a little less than 70% in the varistor element of the comparative example.

Furthermore, tanδ is not more than 0.2 throughout the entire temperature range in the varistor element of the example, whereas the value of tanδ starts quickly varying near 40° C. and increases to about 1.8 at 150° C. in the varistor element of the comparative example. With application of the voltage of 3 V, the leak current was not more than 10 nA in the varistor element of the example, while the leak current was approximately several hundred nA in the varistor element of the comparative example, which is not shown.

In another evaluation experiment, he amount and ratio of Ca existing in the grain boundary and in the grain interior were varied by changing the ratio of Ca in the range of 0.1 atm %-10 atm % and changing the firing temperature between 1080° C. and 1220° C., in the varistor material in production of 1608 type varistor elements similar to that in the aforementioned embodiment. Each of the samples thus produced was evaluated by measuring the change rate in capacitance and the change rate in tanδ at 85° C., where the capacitance at 20° C. was defined as a reference (±0%).

FIG. 9 is a drawing showing the experiment results of this evaluation experiment. Among the samples shown in the same drawing, samples No. 1-No. 5 are the varistor elements of examples, in which the amount of Ca in the grain interior is in the range of 0.2 atm %-2.0 atm % and the ratio of the amount of Ca in the grain interior to the amount of Ca in the grain boundary is in the range of 0.1-0.4. In the varistor elements of examples, the change rate in capacitance and the change rate in tanδ at 85° C. both were not more than 10%.

On the other hand, samples No. 6-No. 8 are the varistor elements of comparative examples, in which the amount of Ca in the grain interior is less than 0.2 atm % or the ratio of the amount of Ca in the grain interior to the amount of Ca in the grain boundary is less than 0.1. In the varistor elements of comparative examples, the change rate in capacitance at 85° C. is 14.0%-18.0% and the change rate in tanδ is 31.0%-120.0%; thus the stability of the temperature characteristics of all the comparative examples was inferior to that of the varistor elements of examples.

It was actually proved by the above results that the varistor elements according to the present invention demonstrated the stable temperature characteristic and that the leak current was also reduced.

What is claimed is:

1. A varistor element comprising a fired product obtained by firing a varistor material containing ZnO as a principal ingredient and containing a rare-earth element, Co, and Ca,
   wherein said Ca exists in each of a grain interior and a grain boundary in the fired product, and
   an amount of said Ca existing in the grain interior in the fired product is 0.2 atm %-2.0 atm %,
   wherein a ratio of an amount of said Ca in the grain interior in the fired product to an amount of said Ca in the grain boundary in the fired product is 0.1-0.4.

2. The varistor element according to claim 1,
   wherein the rare-earth element is Pr, and
   wherein said Pr exists in the grain boundary in the fired product.

* * * * *